Patented Sept. 9, 1924.

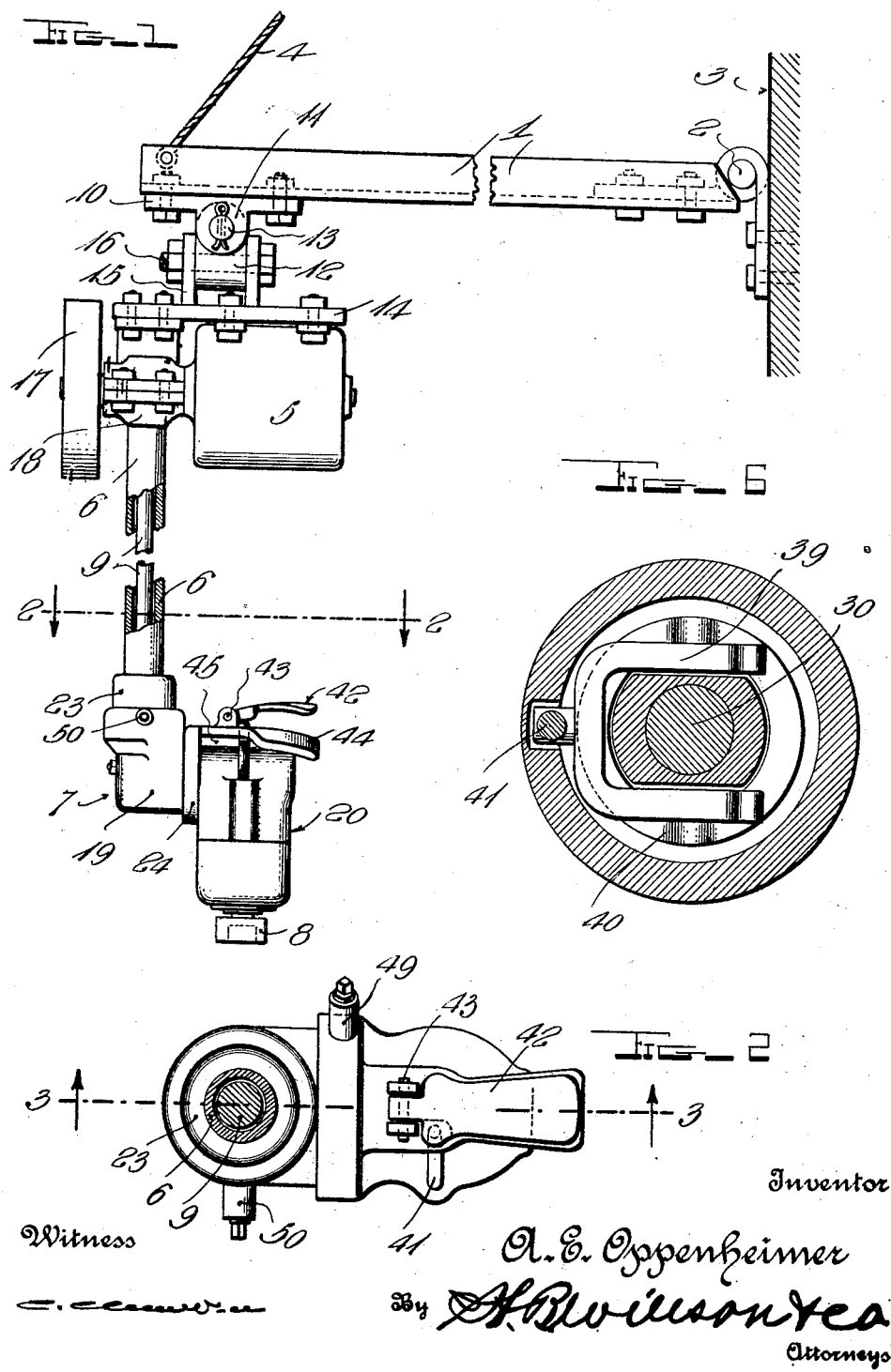

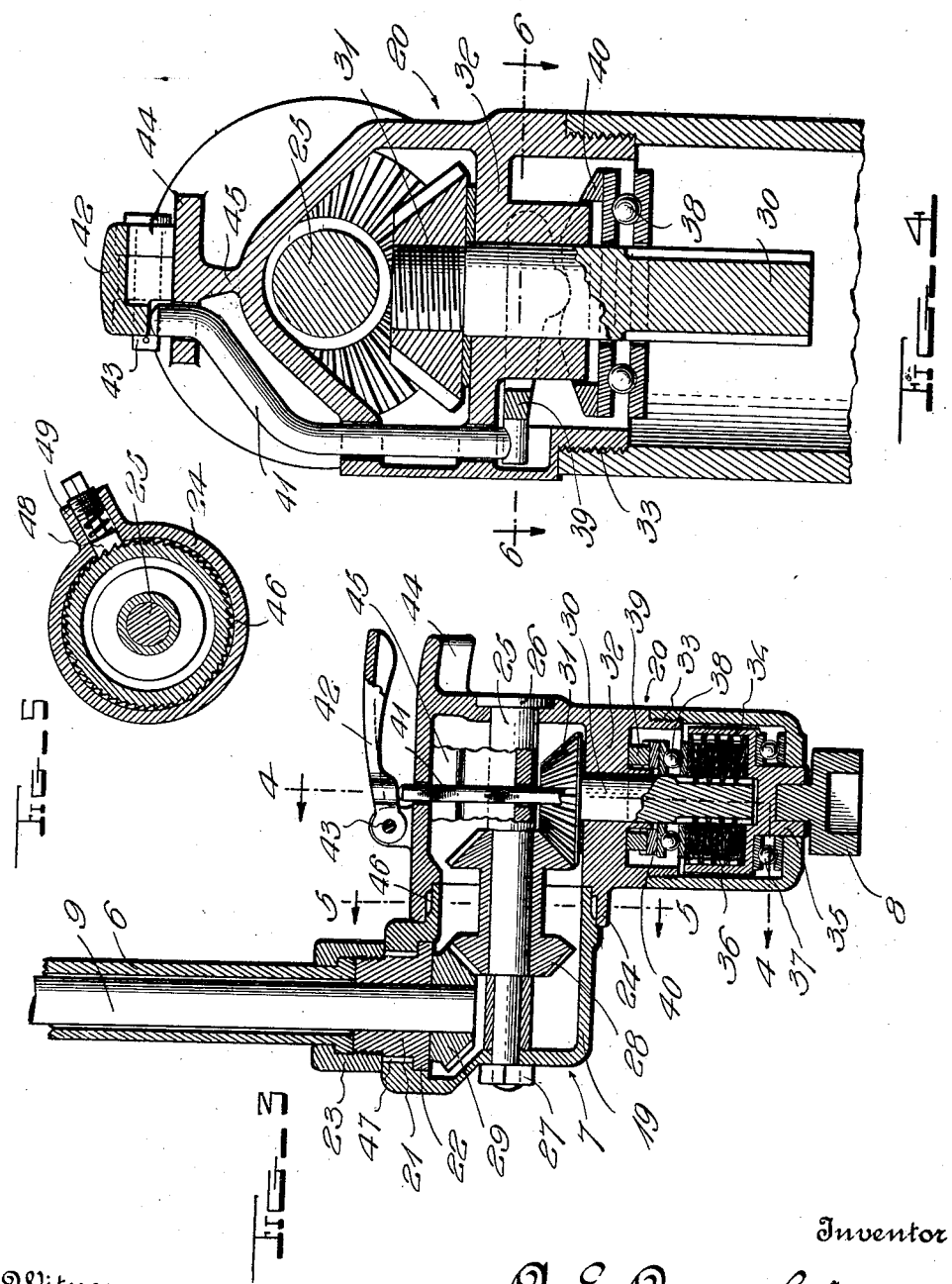

1,507,620

UNITED STATES PATENT OFFICE.

ALFRED EDWARD OPPENHEIMER, OF MOLINE, ILLINOIS.

NUT AND BOLT TIGHTENING MACHINE.

Application filed February 8, 1923. Serial No. 617,823.

*To all whom it may concern:*

Be it known that I, ALFRED E. OPPENHEIMER, a citizen of the United States, residing at Moline, in the county of Rock Island and State of Illinois, have invented certain new and useful Improvements in Nut and Bolt Tightening Machines; and I do declare the following to be a full, clear, and exact description of the invention, such as will enable others skilled in the art to which it appertains to make and use the same.

My invention relates to improvements in power-operated, hand-controlled shop equipment and the present disclosure thereof is directed to a machine for tightening nuts, bolts and cap screws, the machine being intended primarily for use when erecting machines, framing, etc., in manufacturing plants, where large production prevails.

The principal object of the invention is to provide a machine of the class described which, while being suspended from an overhead support, may be moved over quite an amount of bench or floor space and easily adjusted to the nut, bolt or the like to be tightened.

Another object is to provide novel means including a clutch and a unique control therefor, for the purpose of driving the socket or other wrench with which the machine may be provided.

With the foregoing in view, the invention resides in the novel subject matter hereinafter described and claimed, the description being supplemented by the accompanying drawings.

Figure 1 is a side elevation, partly in section.

Figure 2 is a horizontal sectional view on line 2—2 of Fig. 1.

Figure 3 is a vertical section as indicated by line 3—3 of Fig. 1.

Figures 4 and 5 are vertical transverse sectional views as indicated by the lines 4—4 and 5—5 of Fig. 3.

Figure 6 is a horizontal sectional view on line 6—6 of Fig. 4.

In the drawings above briefly described, which illustrate the preferred form of my invention, the numeral 1 designates an arm preferably formed of channel metal, one end of said arm having a suitable hinge joint 2 by means of which it may be mounted upon a post or other upright support 3, for vertical swinging, the free end of said arm being provided with a cable 4 which leads to a suitable counterbalance (not shown). A prime mover 5 is pivotally hung from the free end of the arm 1 and an upright carrier 6 depends from this prime mover and carries a gear casing 7 containing gearing for driving a nut socket 8 or other rotary element, the gearing in the casing being driven from the prime mover by means of a vertical drive shaft 9.

In the preferred form of construction, the prime mover 5 is supported in the following manner: A plate 10 is bolted to the lower side of the arm 1 and is provided with a pair of depending ears 11 between which the upper end of a coupling block 12 is pivoted on a horizontal axis 13. A horizontal plate 14 below the coupling block 12 is provided with upright ears 15 pivoted on a horizontal axis 16 to the lower end of the block 12, the axes 13 and 16 being at right angles to each other so that the plate 14 may move in numerous directions. The prime mover 5 which is preferably in the form of an electric motor is bolted to the underside of the plate 14 and its shaft may well be provided with a fly-wheel 17. Between this fly-wheel and the motor casing, I have shown a gear casing 18 containing suitable worm gearing for driving the shaft 9, the latter being shown within the hanger 6 which is of tubular form to form a protecting housing therefor.

In the construction herein disclosed, the casing 7 is formed of an upper L-shaped section 19 and a relatively large lower section 20 of inverted L-shape. Both ends of the casing section 19 are open and the upper end thereof receives a cylindrical bearing member 21 having an external rib 22 on its lower end which is preferably countersunk in the casing as shown. The upper end of the bearing member 21 extends above the casing section 19 and abuts the lower end of the tubular carrier 6, this carrier being tightly secured to said bearing member by a suitable coupling 23.

The upper end of the casing section 20 is provided with a laterally opening portion 24 which rotatably surrounds the laterally opening lower end of the casing section 19, the two sections being connected by a stationary shaft 25 having a head 26 at one end and a nut 27 at the other end. Rotatable upon this shaft, is a double faced bevel gear 28 which is driven by a pinion 29 on the lower end of the drive shaft 9, said gear 28 being operative to drive a vertical shaft 30 in the casing section 20, through the instrumentality of a bevel gear 31 on said shaft.

In the construction shown, the shaft 30 passes rotatably through an opening in the horizontal partition 32 with which the casing section 20 is provided and a portion of this casing section below the partition is preferably removable, being secured in place by screw threads or the like 33. Within the removable lower portion of the casing section 20, is a clutch drum 34 having a stub-shaft 35 carrying the socket 8 and preferably of such construction that sockets of different sizes may be used. Within the drum 34, is a common form of spring-opened disk clutch 36 which is normally idle, but acts when its disks are brought together, to drive the stub-shaft 35 and socket 8 from the constantly rotating shaft 30.

The drum 34 preferably rests upon a roller thrust bearing 37 and a similar bearing 38 is interposed between the upper end of the clutch 36 and a forked lever 39 which fulcrums against the partition 32 and is adapted to force downwardly upon a thrust collar 40 at the upper end of the bearing 38. For operating the lever 39, an upright rod 41 rises therefrom through the top of the casing section 20 and may be depressed by a handle 42.

In most instances, the above mentioned handle 42 is pivoted at 43 upon a stationary handle 44 which extends along the upper portion of the casing section 20 being connected with the latter by a horizontal rib 45. The relation is such that the two handles 42 and 44 are normally spaced apart to some extent, but both of these handles may be simultaneously gripped with one hand and the handle 42 depressed to cause the clutch 36 to drive the socket 8. By controlling the pressure on the handle 42, the socket may be driven more or less positively as occasion may dictate.

Attention is directed to the fact that the entire casing section 7 may be horizontally swung about the hanger 6, due to the fact that it is mounted upon the bearing member 21. Similarly, the casing section 20 may be vertically swung upon the upper section 19. It is advisable however to provide means whereby the two casing sections, while being readily movable to properly position the machine for use, cannot rotate with the shafts and gearing contained therein. For this purpose, I have provided the laterally opening lower end of the casing section 19 and the periphery of the bearing member 21, with ratchet teeth 46 and 47 respectively, the teeth 46 being co-operable with a spring-pressed detent 48 in a suitable guide 49 carried by the portion 24 of the casing section 20. Similarly, the teeth 47 co-act with another spring-pressed detent within a guide 50 carried by the casing section 19.

From the foregoing, it will be seen that a comparatively simple, yet a highly efficient and desirable machine has been provided for carrying out the objects of the invention and since excellent results may be obtained from the details disclosed, they may well be followed. However, within the scope of the invention as claimed, numerous minor changes may be made.

I claim:

1. A machine of the class described comprising a vertically movable elevated support, a prime mover pivotally hung from said support, a gear casing below said prime mover and a vertical hanger rigidly connecting said prime mover and said casing, gearing in said gear casing and a shaft driven thereby, and a drive shaft for said gearing extending thereto from said prime mover.

2. A machine of the class described comprising an elevated support, a coupling block under said support and pivoted thereto on a horizontal axis, a horizontal plate under said coupling block having upstanding ears straddling the latter and pivoted thereto on a horizontal axis at right angles to the aforesaid axis, a prime mover under and secured to said plate, a rigid hanger and a shaft depending from said plate, said shaft being driven by said prime mover, a gear casing carried by the lower end of said hanger, and gearing in said casing driven by said shaft.

3. A structure as specified in claim 1; said gear casing being connected with said hanger for swinging movement in a horizontal plane; said casing having a section swingable in a vertical plane and carrying the first mentioned shaft.

4. A machine of the class described comprising a tubular hanger and a drive shaft therein, an L-shaped casing section having its upper end swiveled to said hanger for swinging in a horizontal plane, an inverted L-shaped casing section having its upper end swiveled to the lower end of said first named casing section for swinging in a vertical plane, a shaft extending through the lower end of said second named casing section, and gearing in the casing sections for driving the last named shaft from said drive shaft.

5. A machine of the class described comprising an elevated support, a prime mover pivotally hung from said support, a gear casing below said prime mover and a vertical hanger connecting said prime mover and said casing, gearing in said gear casing and a shaft driven thereby, and a drive shaft for said gearing extending thereto from said prime mover.

6. A machine of the class described comprising an elevated support, a prime mover under said support, means pivotally connecting said prime mover and support, and permitting universal swinging of the former, and a work-producing shaft driven by and extending downwardly from said prime mover, said shaft and prime mover having a fixed angular relation.

7. A machine of the class described comprising an elevated support, a prime mover under said support, means pivotally connecting said prime mover with said support for universal swinging, a hanger extending downwardly from said prime mover and having a fixed angular relation with respect thereto, a gear-containing casing carried by the lower end of said hanger and having pivotal movement, a shaft extending from the prime mover to the gearing in said casing for driving the latter, and a shaft driven by said gearing.

8. A machine of the class described comprising an elevated support, a horizontal supporting member under said support, means pivotally connecting said support and supporting member and permitting swinging movement of the latter, a prime mover under and secured to said supporting member, a work-producing shaft extending downwardly from said prime mover, and a housing for said shaft rigidly secured to said supporting member.

9. A machine of the class described comprising an elevated support, a horizontal supporting member under said support, means pivotally connecting said support and supporting member and permitting swinging movement of the latter, a prime mover under and secured to said supporting member, a rigid hanger and a shaft depending from said supporting member, said shaft being driven by said prime mover, a gear casing carried by the lower end of said hanger, and gearing in said casing driven by said shaft.

In testimony whereof I have hereunto affixed my signature.

ALFRED EDWARD OPPENHEIMER.